US011320947B2

(12) United States Patent
Peters et al.

(10) Patent No.: US 11,320,947 B2
(45) Date of Patent: May 3, 2022

(54) CONTROL AND PROCESSING UNIT FOR A TOUCH-SENSITIVE SCREEN, A SYSTEM THEREWITH AND A METHOD FOR USE

(71) Applicant: Interactive Scape GmbH, Berlin (DE)

(72) Inventors: Günter Paul Peters, Berlin (DE); Philipp Ewerling, Berlin (DE); Ulrich Mangold, Berlin (DE); Hauke Helmer, Berlin (DE)

(73) Assignee: Interactive Scape GmbH, Berlin (DE)

( * ) Notice: Subject to any disclaimer, the term of this patent is extended or adjusted under 35 U.S.C. 154(b) by 0 days.

(21) Appl. No.: 15/733,767

(22) PCT Filed: Dec. 18, 2018

(86) PCT No.: PCT/EP2018/085509
§ 371 (c)(1),
(2) Date: Oct. 20, 2020

(87) PCT Pub. No.: WO2019/201464
PCT Pub. Date: Oct. 24, 2019

(65) Prior Publication Data
US 2021/0263617 A1   Aug. 26, 2021

(30) Foreign Application Priority Data

Apr. 20, 2018 (EP) .................................... 18168536

(51) Int. Cl.
*G06F 3/044* (2006.01)
*G06F 3/041* (2006.01)

(52) U.S. Cl.
CPC ............ *G06F 3/0446* (2019.05); *G06F 3/044* (2013.01); *G06F 3/0447* (2019.05);
(Continued)

(58) Field of Classification Search
CPC ....... G06F 3/04162; G06F 3/044–0448; G06F 3/0441; G06F 3/0442
See application file for complete search history.

(56) References Cited

U.S. PATENT DOCUMENTS 6,710,754 B2 * 3/2004 Hanson ................. G06F 1/1601
345/2.1
6,755,533 B2 * 6/2004 Fraser ................... G06F 1/1626
353/10
(Continued)

FOREIGN PATENT DOCUMENTS

DE    202012103377.1 U1    9/2012

OTHER PUBLICATIONS

"European Application Serial No. 18168536.3, Extended European Search Report dated Nov. 6, 2018", (Nov. 6, 2018), 7 pgs.
(Continued)

*Primary Examiner* — Patrick F Marinelli
(74) *Attorney, Agent, or Firm* — Schwegman Lundberg & Woessner, P.A.

(57) ABSTRACT

The invention relates to a control and processing unit for a touch-sensitive screen and comprises a communication unit and a memory. The control and processing unit is configured for receiving first sensor data which is generated by way of capacitive sensors of the touch-sensitive screen, for receiving second sensor data which is transferred from an input unit to the control and processing unit, wherein the second sensor data comprises data of a sensor of the input unit, said sensor being designed to detect a putting-down of the input unit, and for examining, on the basis of a temporal sequence of the first and second sensor data, whether a putting-down of the input unit has been detected simultaneously with the placing of an object with a conductive structure onto the touch-sensitive screen, in order to ascertain whether the input unit has been put down on the touch-sensitive screen.

(Continued)

Figure 1A:
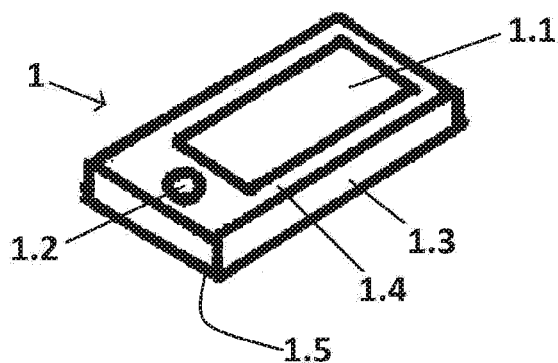

The invention further relates to a system with such a control and processing unit, as well as to a method for use.

18 Claims, 4 Drawing Sheets

(52) U.S. Cl.
 CPC ........ *G06F 3/0448* (2019.05); *G06F 3/04162* (2019.05); *G06F 3/04186* (2019.05)

(56) References Cited

U.S. PATENT DOCUMENTS

| | | | | |
|---|---|---|---|---|
| 7,057,579 B2* | 6/2006 | Hanson | ................ | G06F 1/1601 |
| | | | | 345/2.1 |
| 9,972,279 B2* | 5/2018 | Shin | ................ | G09G 5/12 |
| 10,852,859 B2* | 12/2020 | Tan | ................ | G06F 3/041 |
| 10,976,837 B2* | 4/2021 | Seger, Jr | ................ | G06F 3/0354 |
| 2003/0098832 A1* | 5/2003 | Fraser | ................ | G06F 1/1652 |
| | | | | 345/87 |
| 2003/0098845 A1* | 5/2003 | Hanson | ................ | G06F 1/1601 |
| | | | | 345/156 |
| 2004/0239581 A1* | 12/2004 | Hanson | ................ | G06F 1/1632 |
| | | | | 345/2.1 |
| 2007/0052617 A1* | 3/2007 | Hanson | ................ | G06F 1/1647 |
| | | | | 345/1.3 |
| 2008/0150921 A1* | 6/2008 | Robertson | ................ | G06F 3/0346 |
| | | | | 345/204 |
| 2008/0229194 A1* | 9/2008 | Boler | ................ | G06Q 30/0641 |
| | | | | 715/700 |
| 2010/0149119 A1 | 6/2010 | Homma et al. | | |
| 2012/0327013 A1 | 12/2012 | Lee et al. | | |
| 2013/0278540 A1* | 10/2013 | Yilmaz | ................ | G06F 3/04162 |
| | | | | 345/174 |
| 2015/0065046 A1 | 3/2015 | Wilfred et al. | | |
| 2016/0313807 A1* | 10/2016 | Shin | ................ | G06F 3/1454 |
| 2020/0183504 A1* | 6/2020 | Helmer | ................ | G06F 3/0393 |
| 2021/0055805 A1* | 2/2021 | Seger, Jr | ................ | G06F 3/04162 |

OTHER PUBLICATIONS

"International Application Serial No. PCT/EP2018/085509, International Search Report dated Jan. 21, 2019", w/ English Translation, (Jan. 21, 2019), 5 pgs.

"International Application Serial No. PCT/EP2018/085509, Written Opinion dated Jan. 21, 2019", (Jan. 21, 2019), 7 pgs.

* cited by examiner

CONTROL AND PROCESSING UNIT FOR A TOUCH-SENSITIVE SCREEN, A SYSTEM THEREWITH AND A METHOD FOR USE

PRIORITY APPLICATIONS

This application is a U.S. National Stage Filing under 35 U.S.C. § 371 from International Application No. PCT/EP2018/085509, filed on Dec. 18, 2018, and published as WO2019/201464 on Oct. 24, 2019, which claims the benefit of priority to European Application No. 18168536.3, filed on Apr. 20, 2018; the benefit of priority of each of which is hereby claimed herein, and which applications and publication are hereby incorporated herein by reference in their entireties.

The invention relates to a control and processing unit for a touch-sensitive screen, according to the main claim, as well as to a system which comprises such a control and processing unit, and to a method for their use.

Nowadays, touch-sensitive screens (touchscreens) are used in different fields. Touch-sensitive screens are used for example in smartphones, tablet PCs and in the most varied of vending machines. One advantage of these touch-sensitive screens is the fact that an input as well as an output can be effected via the screen. Touch-sensitive screens are typically capable of detecting the location of the screen, at which it was touched by a finger.

Capacitive touch screens are applied in many touch-sensitive screens. Hereby, two grids of transparent electrical conductors which are aligned transversely to one another lie in a glass. The upper of the two conduction grids constantly sends electrical signals to the lower grid. If the screen is touched with a finger, then an electrical capacitance of the insulating layer which lies therebetween changes and a signal at these locations becomes weaker. A processor then computes a position, at which the signal has dropped off and transfers the location and the duration of the touch to software of the device. This in turn carries out a corresponding action upon the touching.

Such capacitive touch-sensitive screens which moreover can often simultaneously detect a multitude of touches (multitouch displays) are not usually designed to detect passive objects which are placed upon the touch-sensitive screen. In contrast, such systems typically comprise filters, in order to filter out touch data which are triggered by passive objects.

Passive input units which are detectable by way of a touch-sensitive screen or methods, in which passive input units are detectable by way of a touch-sensitive screen, have been suggested in the literature.

US 2010/0149119 A1 relates to an information processing device which monitors a capacitance change of a capacitive touch screen. Herein, the change of capacitance is caused by a conductive material, into which pattern information such as e.g. a QR code can be coded.

At least one or two or more of the following conditions should be fulfill for a trouble-free operation of a touch-sensitive screen by way of the input unit:
1. It should be able to be ascertained whether or not input units are currently present on the touch-sensitive screen and specifically independently of whether they are touched by the user or not and independently of their position and orientation on the touch-sensitive screen.
2. Each input unit should be unambiguously identifiable.
3. An exact position and/or orientation of the input unit or of the input units should be able to be determined.
4. A change of the position and orientation of rapidly moving input units should be detectable without a noticeable delay.

It has been found that many systems which are disclosed in the state of the art are not capable of fulfilling at least one or more than one or all of these four conditions or not to a satisfactory extent.

It is the object of the invention to put forward a control and processing unit for a touch-sensitive screen, said unit overcoming the described disadvantages of the state of the art. It is further an object of the invention to provide a method for the use of a touch-sensitive screen which is capable of at least partly overcoming the disadvantages of the state of the art.

This object is achieved by a control and processing unit with the features of the main claim as well as by a method with the features of the further independent claim. Further developments are to be derived from the features of the dependent claims as well as from the description and figures.

Such a control and processing unit for a touch-sensitive screen comprises a communication unit and a memory.

The control and processing unit is configured to receive first sensor data which is detected by way of capacitive sensors of the touch-sensitive screen. Capacitance changes which are caused by conductive structures of the objects which contact the screen or of objects which are placed on the screen can be detected by the capacitive sensors. This detection typically comprises a locally resolved determining of the magnitude of the thus caused capacitance changes.

Furthermore, the control and processing unit is configured to receive second sensor data which is transferred from an input unit to the control and processing unit. The second sensor data comprises data of a sensor of the input unit, said sensor being designed to detect a putting-down of the input unit.

The control and processing unit is configured to examine, on the basis of a temporal sequence of the first and second sensor data, whether a putting-down of the input unit has been detected simultaneously with the placing of an object with a conductive structure onto the touch-sensitive screen. Thus one can determine whether the input unit was put down on the screen, thus whether the detected conductive structure is a conductive structure of the input unit and therefore whether the placed-on object is the input unit.

The control and processing unit then creates and stores a capacitance pattern for the conductive structure of the input unit, wherein the capacitance pattern comprises a spatially resolved representation of at least two differently large capacitance changes or of at least three capacitance values which are differently large in pairs or variables which are derived therefrom.

If the contacting of the screen and the putting-down of the input unit have been detected simultaneously, then the control and processing unit creates a coupling mode for the input unit by way of it sending data to the input unit and/or receiving data from the input unit.

A detection of magnitudes of capacitance changes which are triggered in a different intensity at different locations by the conductive structure is rendered possible by the capacitive sensors. Magnitudes of the capacitance changes at different locations and not only a location, at which a capacitance change occurs, can thus be imaged in the capacitance pattern, similarly to the case with a greyscale image. As mentioned, the capacitance pattern therefore comprises at least two differently large capacitance changes at different locations and contains their relative position, thus for example their distance. The at least two different capacitance changes as a rule therefore contain at least the information from two different black-and-white pictures with different capacitance change thresholds. In possible embodiments, the capacitance patterns are stored as a greyscale image with two greyscales or as at least two black-and-white pictures with different thresholds.

In particular, with the control and processing unit with the described features it is possible to use an electronic device such as for example a mobile telephone or a tablet or a comparable device as an input unit. Herein, due to the described detection of the capacitance pattern, it is possible to use the device without having to modify it with regard to its construction, thus without e.g. a casing having to be changed or a sleeve having to be attached.

Furthermore, the sensors, e.g. acceleration sensors, which are typically present in such electronic devices can be used for gathering the second sensor data.

The disadvantages of the state of the art are at least partly overcome by this, even when using an unmodified mobile telephone or tablet as an input unit and no specially manufacturing input units are necessary for the operation of the touch-sensitive screen.

Herein, for example so-called adapting thresholding methods can be applied for setting the thresholds, wherein a threshold value for a pixel is computed from signals from the environment of the pixel. In particular, such methods permit a recognition of several input units (this possibility is explained in detail further below) if their conductive structures trigger differently strong signals on account of their design or on account of their alignment with regard to the grid of the touch-sensitive screen. It is also possible by way of adaptive thresholding to detect different regions of a single input unit, in which regions the conductive structure of the input unit produces differently strong signals, with a different threshold.

The touch-sensitive screen can therefore be configured to detect capacitance changes of 10 pF or less. In possible embodiments for example, capacitance changes of 3 pF, preferably of 1 pF, particularly preferably of 0.1 pF are detectable. A glass thickness of the touch-sensitive screen can be for example 4 mm or less. By way of this, it is rendered possible to detect input units or their conductive structures even through a sleeve. Furthermore, by way of this it can be rendered possible to reliably detect the input unit independently of its orientation, which is to say even if a weak signal coincidently results due to the alignment of the conductive structure relative to the measuring points or to the grids of the touch-sensitive screen.

By way of this, a differentiated characteristic picture of the conductive structure is acquired by the capacitance pattern, which on the one hand represents a recognition feature similarly to a fingerprint and on the other hand permits a tracking on the screen and a detection of an orientation on the screen. An analysis and processing of the thus stored or tracked capacitance patterns can be carried out by the control and processing unit with picture processing methods. The positions of the induced capacitance changes are detected at least relative to one another for determining the described capacitance pattern.

As mentioned, by way of the described analysis of the first and second sensor data or by way of the comparison of the first and second sensor data, one can verify that the placed-on object with the conductive structure is the put-down input unit. The verification of the input unit is therefore achieved by the physical process of placing-on. This can represent a desired safety feature compared to a simple coupling mechanisms such as for example the creation of a Bluetooth connection (pairing), said security feature being achieved by the suggested device.

If the input unit is verified and is situated in the coupling mode, then supplementary and/or redundant or partly redundant information on the input unit results from the first and second sensor data, said information being used by the control and processing unit or in a corresponding method which is carried out by this. Herein, redundancy is particularly relevant for creating the coupling mode or for the verification. This has been explained in the context of examining whether the putting-down and placing-on have taken place simultaneously. Supplementary data can serve for detecting actions with a greater accuracy or reliability after the coupling mode is created. This aspect is explained yet further later.

Typically, capacitance changes which are triggered by a single input unit are detected at more than two locations. For example, with a resolution of at least 1 pixel per 35 mm$^2$, preferably with a resolution of at least 1 pixel per 15 mm$^2$, particularly preferably with a resolution of at least 1 pixel per 6.8 mm$^2$. For example, the touch-sensitive screen can have a screen diagonal of between 10 and 100 inches. In an embodiment, the touch-sensitive screen has a screen diagonal of 55 inches, with dimensions of 1220 mm×680 mm and has 172×105 pixels, at which the first sensor data is gathered and the conductive structure of the input unit can therefore be detected.

The conductive structure which is detectable by the sensors of the touch-sensitive screen comprises electrically conductive components of the input unit. As initially mentioned, capacitive sensors can detect certain structures, even if these are not touched (passively). It has been found that with the suggested control and processing unit for the touch-sensitive screen, conductive structures of a mobile telephone, of a tablet or of other electronic devices can be detected and their capacitance pattern can be recorded, even if the device is not touched. In particular, this is achieved by the design of the capacitance pattern which is described here and by way of the described use of capacitive sensors. In typical cases, the input unit is a mobile telephone or a tablet. It should be noted that whenever hereinafter one speaks of a mobile telephone, this also always means other electronic devices which in the context of this invention are constructed or configured in a similar manner, such as for example tablets. The similarity of the devices is hereby related to the interaction of the respective electronic device with the sensors of the touch-sensitive screen and with the control and processing unit. The conductive structures of a mobile telephone or tablet which are detected as described above and represent a fingerprint of the mobile telephone or of the tablet are for example strip conductors, parts of a camera of the mobile telephone or of the tablet, parts of a battery of the mobile telephone or of the tablet or parts of a housing of the mobile telephone or of the tablet. The detected structures can therefore lie within a housing and in typical cases themselves have no direct contact with the touch-sensitive screen.

As mentioned, the input unit or the mobile telephone are passive input devices in the above context. Nonetheless, the capacitance changes which are triggered by the conductive structures of the mobile telephone or of the input unit are greater if the mobile telephone is touched. Typically, the capacitance pattern is directly detected on placing on, when the input unit is touched, in order to achieve a good as possible contrast.

The suggested control and processing unit can be configured to also determine a position of the put-down input unit on the touch-sensitive screen when the input unit has been put down on the screen. Apart from the determining of a relative position of the capacitance changes which are induced by the input unit, said determining being necessary for the capacitance pattern, this also encompasses a determining of an absolute position of the input unit on the touch-sensitive screen. For this, at least one point of the capacitance pattern is assigned to a location on the touch-sensitive screen, at which the respective capacitance change is effected. Accordingly, a greyscale image or one or more black-and-white pictures can be taken for this, said pictures not only encompassing the region, in which the capacitance changes are induced, but the whole screen. Typically, a position of an outline or an outer edge of the input unit on the screen is detected for determining the position. The position of the outline can be extracted for example from one of several recorded black-and-white pictures. For example, a detection of the outline can be effected from the black-and-white picture with the lowest threshold value.

Then, apart from the position, one can yet also detect an orientation of the input unit from black-and-white pictures with a higher threshold value, concerning which pictures the structure is detected in relation to the complete screen. A different contrast and detail degree is achieved depending on the threshold value, so that it is possible to resolve the structure better by way of additional threshold values.

The suggested device permits different structures of different mobile telephones to be recognised. Since the capacitance changes which are induced by the different structures of the different mobile telephones can differ from one another, one typically envisages the control and processing unit being configured to react to differently pronounced capacitance changes. One can envisage the control and processing unit being designed to use predefined threshold values for the capacitance changes in a first detection step.

The control and processing unit can be configured to compare detected capacitance patterns of the input unit with already known capacitance patterns. The control and processing unit for example in a first step can record a coarse capacitance pattern with a few threshold values. This can entail speed advantages. Recorded capacitance patterns can be compared to the known capacitance patterns, wherein the known capacitance patterns have been detected for example by methods of machine learning. This then permits a model of a mobile telephone to be determined. The input unit does not therefore have to be measured completely on placing-on, but only to the extent of an assignment to an already known model. Data which can be present in the memory for the already known models can herein comprise for example typical capacitance changes which are induced on placing on and also further data which can be helpful on using the control and processing unit. Thus for example one can store which type of capacitance changes are characteristic of a certain input unit on placing-on, letting-go of, rotating or picking up. The control and processing unit has for example information on which signals a certain input unit induces when it is let go of or moved or rotated, and/or information on how a signal which is triggered by the input unit changes in dependence on its orientation.

The control and processing unit can be configured to determine an orientation of the input unit from the capacitance pattern. As mentioned, the position of the input unit is detected by way of the absolute position of the capacitance changes which are caused by it, with regard to the total dimensions of the touch-sensitive screen, being extracted from the first sensor data. Whereas for example single black-and-white picture with a low threshold value or a use of the lowest threshold value of a greyscale picture is necessary for determining the position, for determining the orientation it can be necessary to use several pictures or greyscales or to select one of several pictures. For this, it is advantageous if a pattern with a broken, as low as possible symmetry or rotational symmetry is recognisable on the black-and-white picture which is used for determining the orientation, or within the greyscale which is used for determining the orientation, due to the capacitance changes. By way of using already known data which is created with the help of machine learning, for a certain model of a mobile telephone it can be known a priori which threshold value is suitable in order to obtain such a pattern with as low as possible symmetry. Symmetries do not then need to be re-examined for a newly placed-on input unit, but one merely needs to carry out the identification which is described above. Typically, the input unit is touched at least on placing on and on moving, so that the detection of the structures is at least then simplified. This aspect is likewise utilised here.

The second sensor data which is received by the control and processing unit can comprise data of an acceleration sensor of the input init. However, alternatively or additionally, it is also possible for the second sensor data to comprise data of a gyroscope and/or of a distance sensor and/or of a colour-sensor and/or of a magnetometer and/or of a GPS system or of another satellite-based positioning system. At least some of these sensors are typically present in mobile telephones or tablets.

A speed increase and/or a speed reduction of the input element in different directions can be recognised with the help of the acceleration sensor. The direction, in which the input unit is accelerated, can be detected for example by the acceleration sensor by way of the acceleration sensor determining from where the gravity acts upon the input element. Hereby, a measurement of the acceleration is effected as a rule in three spatial directions which are perpendicular to one another.

In a further development, the acceleration sensor is designed for detecting a putting-down if the input unit. On putting down the input unit, for example onto the touch-sensitive screen, the input unit typically obtains a characteristic acceleration. One can therefore recognise whether the input unit has been put down by way of detecting this characteristic acceleration.

The acceleration sensor can moreover be designed for detecting a picking-up of the input element, for example from the touch-sensitive screen. The input element also obtains a characteristic acceleration on picking up the input element, said acceleration being detectable by the acceleration sensor.

The acceleration sensor can further be designed for detecting an acceleration of the input element on the touch-sensitive screen. If the input element is translatorily or rotationally moved on the touch-sensitive screen after it having been put down on the touch-sensitive screen, then this is therefore detectable by the acceleration sensor.

An accuracy of the acceleration sensor can be at least ±2.5% of 8 g, 4 g or 2 g or smaller, thus ±0.2 g, ±0.1 g or ±0.05 g or smaller, wherein g is the spatially dependent earth's gravity and is e.g. approx. 9.81 m/s$^2$.

As described above, by way of a temporal resolution of the acceleration one can determine when and whether the input unit has been placed onto the touch-sensitive screen. This is advantageous given a quasi simultaneous placing-on of different input units, since one can hence unambiguously determine which input element has been placed on when and where. The possibility of several input units is yet explained in detail hereinafter. For this, the acceleration sensor can be designed for detecting an acceleration with a temporal accuracy of at least 100 milliseconds, preferably at least 50 milliseconds, particular preferably at least 20 milliseconds, in particular at least 10 milliseconds. A data transmission rate of the acceleration sensor can be between 1.6 Hz and 800 Hz, i.e. values can be transmitted every 641 ms or every 1.25 ms.

In a similar manner, the touch-sensitive screen can have a temporal resolution of at least 100 milliseconds, preferably at least 50 milliseconds, particular preferably at least 20 milliseconds, in particular at least 10 milliseconds, for a detection of a contacting. This means that for example the 172×105 measurement values of the pixels of the aforementioned possible 55 inch screen or a similar number of sensor data can acquired at such a rate. These are typically digitalised in a first step. The digitalisation can be effected in the control and processing unit or in a touch controller of the control and processing unit or and can also comprise a step for interpolating the data. The digitalisation can be carried out once every 50 ms, every 10 ms or more often, for example very millisecond or every 0.1 ms. The digitalised data or the analog sensor data can then be transferred to the control and processing unit, typically via a cable connection, such as USB, for example USB 1.1 or, preferably, USB 2.0 or greater.

Preferably, time measurements are synchronised in the input unit and in the touch-sensitive screen, so that temporal sequence can be compared to one another. The control and processing unit can acquire for example the temporal sequence of the first and the second sensor data each with an accuracy of 100 ms, preferably 50 ms, particular preferably 20 ms, in particular at least 10 ms.

In an embodiment, the input unit comprises a gyroscope for detecting a rotation movement of the input element. The gyroscope measures e.g. a rotary speed and therefore rotary movement of the input unit. The gyroscope typically uses Coriolis force and the so-called tuning fork principle for determining the orientation. In the gyroscope which typically has a size of 4×4 mm, e.g. metal elements are brought into oscillation by way of a current. If the input unit moves, then the oscillation of the metal elements changes and capacitors which are arranged around this register a change which is then detected as a rotation movement. Other sensors for rotation speeds and which correspond to the state of the art are conceivable. The gyroscope can preferably detect rotation speeds of up to 2000°/s with an accuracy of 0.0625°/s and with a data rate e.g. of 12.5 Hz to 800 Hz.

In a further development, the input unit comprises a field sensor for detecting an electrical field strength of the touch-sensitive screen and/or for measuring a change of the electric field strength of the touch-sensitive screen. By way of the field sensor, one can therefore also detect whether the input unit lies on touch-sensitive screen. The field sensor can detect the field strength e.g. with a measuring frequency of at least 50 kHz, at least 100 kHz, at least 200 kHz or at least 300 kHz. For example, the field sensor detects the field strength with a frequency of 400 kHz.

In a further embodiment, the input unit comprises a colour sensor or several colour sensors for detecting a colour in at least one region of the touch-sensitive screen, said colour being displayed by the touch-sensitive screen. In particular, the colour sensor is designed as a light sensor which detects at least a part of the visible spectrum (thus roughly from 380 nm to about 780 nm). The colour sensor can also be designed as a camera. For example, a position change of the input unit can be detected by way of a detection of a certain colour on the touch-sensitive screen and a comparison of this colour with a colour course or colour pattern, said course or pattern being reproduced by the touch-sensitive screen. For this, the touch-sensitive screen displays a colour pattern or a colour course. The control and processing unit then with the help of the colour which is recognised by the colour sensor can then determine where the input unit is located on the screen.

In a further embodiment, the input unit comprises a proximity sensor for detecting a distance between the touch-sensitive screen and the input element. A range of the proximity sensor can be up to 10 cm depending on the embodiment. The proximity sensor usually uses an infrared beam, in order to examine whether the screen approaches the input unit. If for example the input unit is placed onto the touch-sensitive screen, then the proximity sensor registers a reflection of the infrared beams by the screen, by which means it is detected that the input unit is located on the touch-sensitive screen.

The control and processing unit which is put forward here can be configured to track rotations and/or translations of the input unit on the screen if the input unit has been put down on the screen. This on the one hand can be effected similarly to the aforementioned position determining by way of evaluating the first sensor data. However, it can alternatively or additionally also be effected by way of evaluating the second sensor data of the sensors which have been described above. In particular, the initially mentioned redundancy or supplementing can be achieved by way of comparing the first and the second sensor data.

Thus for example one can envisage the second sensor data being used in order to break the symmetry, if a determining of an orientation of the input unit from the symmetries of the capacitance patterns is not possible or only with a great effort, for example due to pictures of a low rotation symmetry not being available due to the contrast.

For example, it can be the case that a mobile telephone has an essentially rectangular capacitance pattern at the level of a very low threshold value. The control and processing unit cannot therefore distinguish between above and below in the case of a weak contrast if no structures such as for example a battery or a camera, are recognisable. The same signal would result in the touch-sensitive screen given a rotation of the input unit by 180°. If the input unit is now moved, then the rotation or the rotation angle (orientation) of the input unit can be unambiguously resolved by way of the measured, direction-dependent acceleration. A security mechanism can be simultaneously provided on account of the redundancy. If the control and processing unit ascertains that the first sensor data and the second sensor data are contradictory and do not permit a movement of the input unit to be assigned, then the coupling mode can be separated.

The control and processing unit is typically configured for the wireless data exchange between the memory of the control and processing unit and a memory of the input unit when the input unit has been put down on the screen. The control and processing unit and the input unit then each have a wireless communication unit. The wireless communication units can form a part of a network. Possible wireless connections include for example WLAN or WPAN, in particular Bluetooth or other near-field connections. The communication units transfer the sensor data and/or signals in intervals of 10 ms to 20 ms.

The connection of the control and processing unit to the touch-sensitive screen can likewise be in a wireless manner; but a connection by way of a cable, for example a USB cable can also be provided.

A connection between the control and processing unit and the input unit, as has been described above, typically exists so that the sensor data of the sensor of the input unit can be transferred to the control and processing unit. If the above mentioned criteria for the coupling mode are fulfilled, then the coupling mode is created.

The control and processing unit can be configured to activate the touch-sensitive screen or the touch-sensitive screen of the input unit, on the basis of the first and/or second sensor data or to receive input signals of the touch-sensitive screen and/or of the touch-sensitive screen of the input unit, in particular if the input unit has been put down on the screen.

The coupling mode can for example further encompass the control and processing unit activating a display of the touch-sensitive screen and/or of the input element on the basis of the first and/or second sensor data. Furthermore, in the coupling mode, one can envisage initiating a data exchange on the basis of the first and/or second sensor data. Such actions can be triggered for example by way of a position change or rotation angle change of the input unit, said change being detected by way of comparing the first sensor data and second sensor data.

As mentioned, the control and processing unit can be configured to activate the touch-sensitive screen of the input unit or to receive input signals of the touch-sensitive screen of the input unit. In typical embodiments, the control and processing unit can also activate the touch-sensitive screen on the basis of the input signals of the touch-sensitive screen of the input unit, in particular in the coupling mode.

The control and processing unit can end the coupling mode if the first sensor data and/or the second sensor data can be attributed to a picking-up of the input unit. However, it is also possible for the coupling mode to continue after the picking-up. If the coupling mode continues to exits after the picking-up, then there is typically a change in a status of the coupling mode. An interaction between the input unit and the control and processing unit, such as for example a data exchange or an activation of the respective touch-sensitive screens can then for example continue to be made possible, but actions which relate to a tracking of the placed-on input unit are no longer carried out. The coupling mode can then be ended for example by way of carrying out a further action.

As mentioned, there exists the possibility of the control and processing unit simultaneously detecting several input units or being simultaneously coupled to several input units. Herein, possible further input units typically comprise the same or similar features as the input unit which is described above and which can be denoted as a first input unit, and interact with the control and processing unit in the same manner.

This can be effected by way of the control and processing unit being configured to receive further second sensor data of at least one further input unit which is transferred from the at least one further input unit to the control and processing unit. The second sensor data then comprises data of a sensor of the at least one further input unit, said sensor being designed to detect a putting-down of the at least one further input unit.

As in the case of the first input unit, it is examined on the basis of the temporal sequence of the first sensor data and of the further second data as to whether a putting-down of the at least one further input unit simultaneously with the placing of a further object with a conductive structures onto the screen has been detected.

One can therefore determine whether the further object is the at least one further input and therefore examine whether the at least one further input unit has been put down on the screen.

A capacitance pattern can then also be created for the conductive structure of the further object and stored.

If the contacting and the putting-down have been detected simultaneously, then a coupling mode for the at least one further input unit is created by way of sending data to and/or receiving data from the at least one further input unit.

If now for example two or more than two input units are located on the touch-sensitive screen, then the control and processing unit can distinguish between the input units typically on account of the temporal sequence on putting-down or placing-on the respective input unit. In particular, this can be ensured by the precise acquisition of the temporal sequences which has been described above. In practise, several input units are not typically placed on simultaneously in a manner such that an assignment on the basis of the first and sensor data is not possible, or the time intervals can be selected such that a scenario, in which a differentiation is not possible, is improbable.

However, if an ambiguity exists between two or more placed-on input units, said ambiguity being desired or not, then for example one or more of these input units can be moved or rotated. Then again by way of comparing the first sensor data and the second sensor data of all lying-on input units, it can be determined which of the input elements has just been moved. The signals which are measured by the acceleration sensor can then be used for the identification of the input element. Likewise, the capacitance pattern can also be used given several lying-on input units, for example if one or more of the input units are already known and their capacitance pattern has already been stored during an earlier coupling. This at the minimum is possible if the lying-on input units are input units which are not constructionally the same, for example different mobile telephone models.

If several input units lie on the touch-sensitive screen and are each identified, then typically the coupling mode is created for each input unit. The coupled input units can then interact with the control and processing unit independently from one another. However, one can also envisage several or some of the several lying-on or coupled input units being coupled to one another, for example indirectly via the control and processing unit, so that for example a data exchange is possible between two coupled mobile telephones via the control and processing unit.

A system which is suggested here comprises a touch-sensitive screen, in particular the previously described touch-sensitive screen, a control and processing unit, in particular the previously described control and processing unit, and an input unit, in particular the previously described input unit.

In such a system, the touch-sensitive screen comprises capacitive sensors for gathering first sensor data. The input unit comprises a conductive structure which on placing the input unit onto a touch-sensitive screen induces local capacitance changes which are detectable by the capacitive sensors of the touch-sensitive screen.

The input unit further comprises a sensor for gathering second sensor data, wherein the sensor is designed to detect a putting-down of the input unit.

The input unit is configured to transfer the second sensor data to the control and processing unit, whereas the control and processing unit is configured to examine, on the basis of a temporal sequence of the first and second sensor data, whether a putting-down of the input unit has been detected simultaneously with the contacting of the screen by an object with a conductive structure. The control and processing unit can therefore determine whether the input unit has been put down on the screen. The control and processing unit can create and store a capacitance pattern for the conductive structure of the input unit, wherein the capacitance pattern comprises a spatially resolved representation of at least two differently large capacitance changes or at least three capacitance values which are differently large in pairs or variables which are derived therefrom.

If the putting-down and the placing-on are effected simultaneously, then the control and processing unit and the input unit create a coupling mode by way of the exchange of data. The initially formulated object is also achieved by such a system.

It is to be noted that the system can also comprise several touch-sensitive screens, for example two touch-sensitive screens or ten touch-sensitive screens. The one or more touch-sensitive screens can be connected to the control and processing unit each with a cable or, e.g. if they are located more remotely from the control and processing unit or cables are undesirable, also per wireless connection such as for example WLAN, Bluetooth or a mobile radio network. The control and processing unit can then be typically configured to interact with the additional screens just as with the first touch-sensitive screen. In such scenarios, it is additionally possible to also provide an interaction between the several screens, thus an action which relates to a first of the several touch-sensitive screens triggers a further action which relates to another of the several touch-sensitive screens.

A method for the use of a touch-sensitive screen in the context of this application, or of a system as described above, comprises at least the following steps:

detecting capacitance changes by way of capacitive sensors of a touch-sensitive screen, wherein the capacitance changes are caused by a conductive structure of an object which contacts the screen, and storing the capacitance changes which are detected by the capacitive sensors, as first sensor data, detecting a putting-down of an input unit by way of sensors of the input unit and storing values which are detected by way of the sensors of the input unit, as second sensor data, examining on the basis of a temporal sequence of the first and second sensor data, as to whether a putting-down of the input unit has been detected simultaneously with a contacting of the screen by the object, in order to determine whether the input unit has been put down on the screen, creating and storing a capacitance pattern for the conductive structure of the input unit, wherein the capacitance pattern comprises a spatially resolved representation of at least two differently large capacitance changes or at least three capacitance values which are differently large in pairs or variables which are derived therefrom, creating a coupling mode between a control and processing unit of the touch-sensitive screen and the input unit by way of an exchange of data between the control and processing unit and the input unit, if the contacting and the putting-down have been simultaneously detected.

The initially formulated task is likewise achieved by way of such a method. By way of the method, it is possible to examine an identity of an input unit which is placed or put down on a touch-sensitive screen, to determine its location and orientation on the screen and to permit an interaction as well as a secure data exchange between the input unit and the touch-sensitive screen, as well as provide different input possibilities for the touch-sensitive screen, in particular by way of inputs via movements of the input unit on the touch-sensitive screen.

The invention further relates to the following aspect:

1. An input unit for a touch-sensitive screen comprising a memory, a communication unit, a sensor and a conductive structure, wherein the conductive structure is designed to induce capacitance changes given a placing of the input unit onto a touch-sensitive screen, said capacitance changes being detectable by capacitive sensors of the touch-sensitive screen, as first sensor data, sending second sensor data to a control and processing unit of the touch-sensitive screen, wherein the second sensor data comprises data of the sensor of the input unit, said sensor being designed to detect a putting-down of the input unit, creating a coupling mode with a control and processing unit of the touch-sensitive screen by way of receiving data from and/or sending data to the control and processing unit of the touch-sensitive screen if it is indicated by the first sensor data and the second sensor data that the placing-on and the putting-down have taken place simultaneously, and a capacitance pattern for the conductive structure of the input unit has been created and stored, wherein the capacitance pattern comprises a spatially resolved representation of at least two differently large capacitance changes or at least three capacitance values which are differently large in pairs or variables which are derived therefrom.

It is to be noted that features which e.g. have only been mentioned with regard to the control and processing unit or to the input unit or to the system can also be claimed for the mentioned method and vice versa.

Furthermore, it is to be noted that features e.g. with regard to the evaluation of data and/or signals of the aforementioned sensors and which have only been mentioned with regard to the control and processing unit or the system can also be claimed for the input unit and vice versa.

The invention is explained by way of the attached figures. There are shown in

Figure 1B:
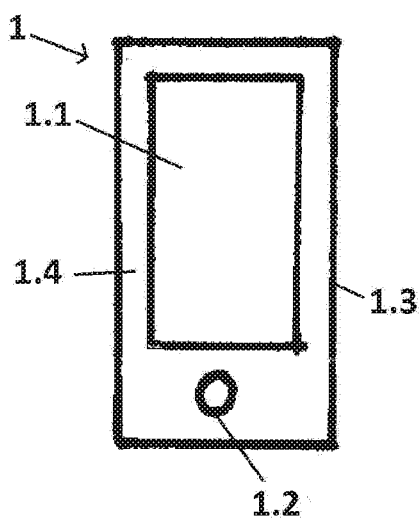
Figure 1C:
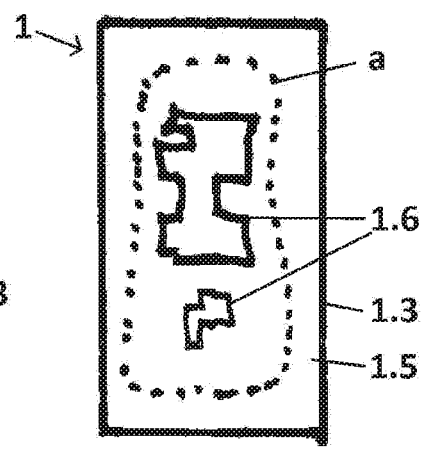
Figure 2:
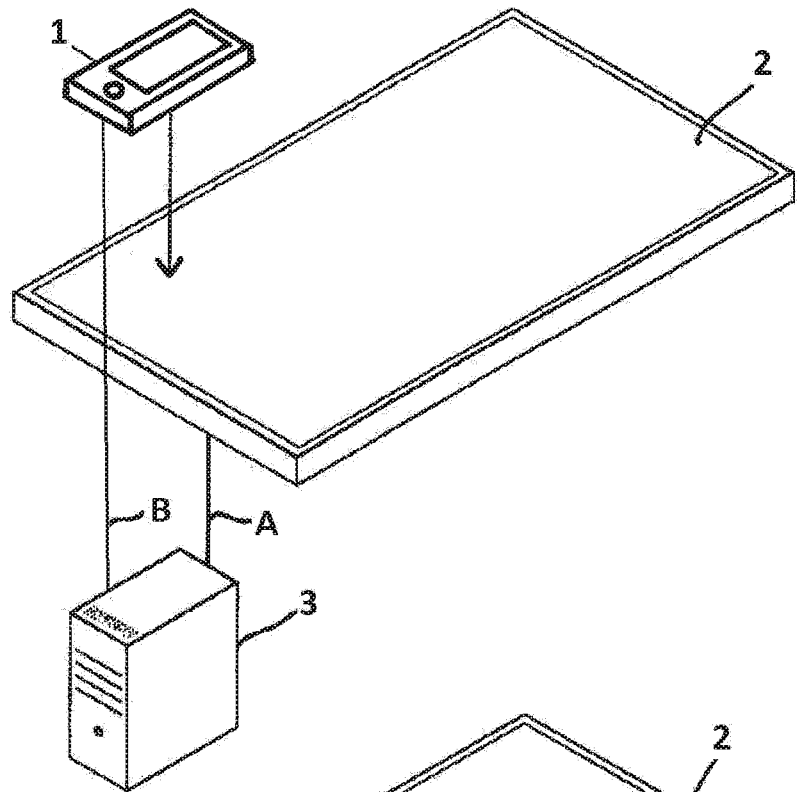
Figure 3:
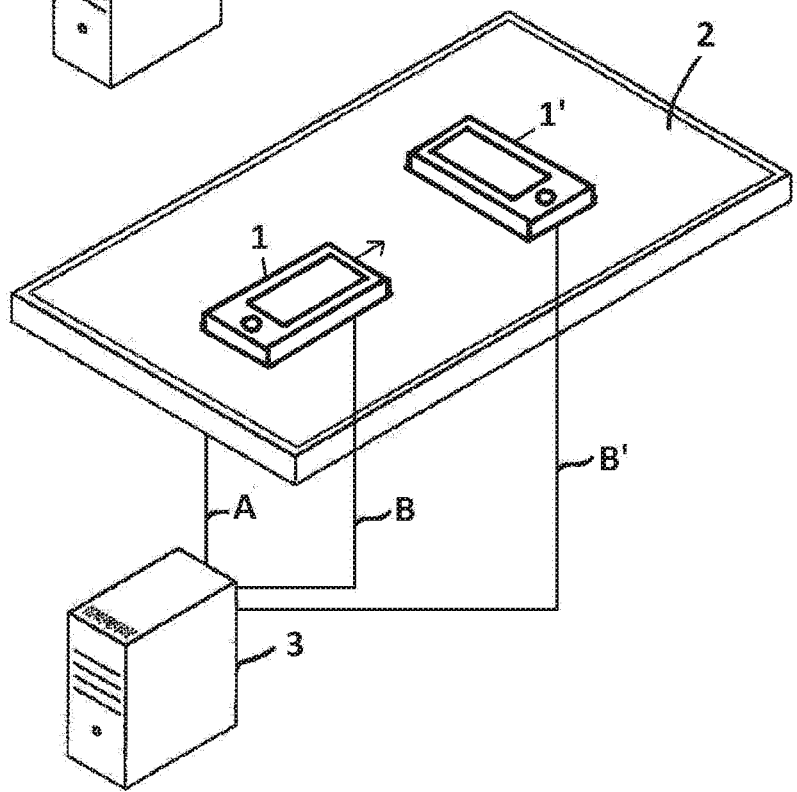
Figure 4A:
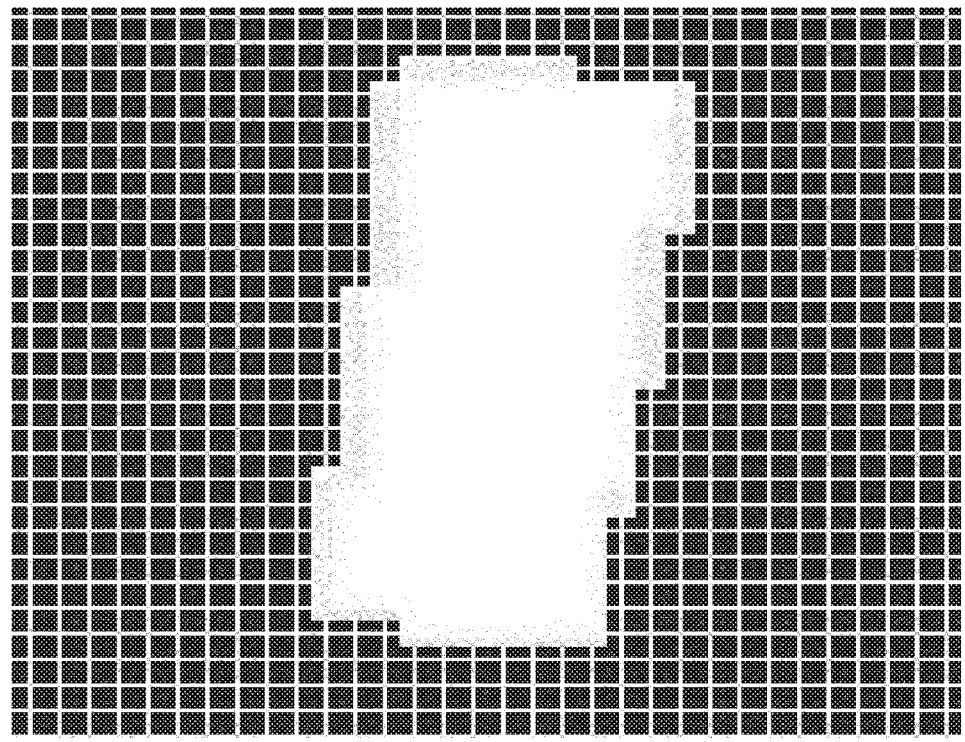
Figure 4B:
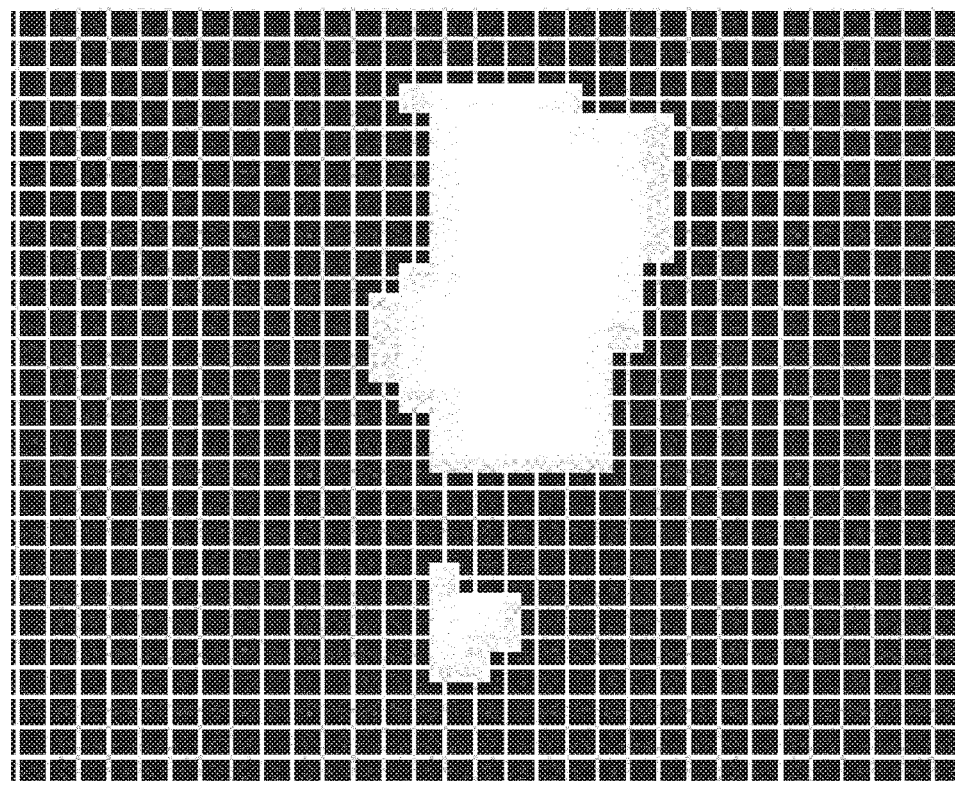
Figure 5:
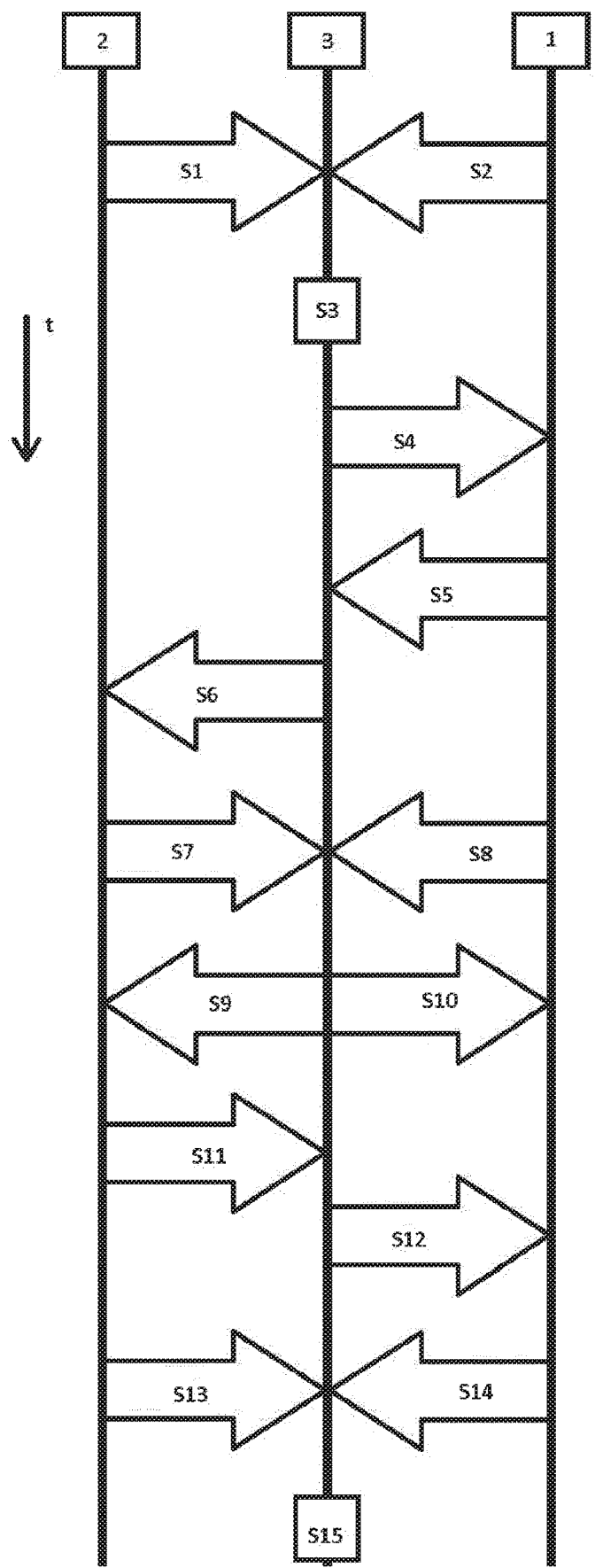

FIG. 1*a-c* different views of the input unit,

FIG. 2 a system comprising a touch-sensitive screen, a control and processing unit and an input unit, FIG. 3 the system of FIG. 2, additionally comprising a further input unit, FIG. 4*a-b* first sensor signals which are represented in a spatially resolved manner, for the placed-on input unit, as black-and-white pictures with different threshold values, and FIG. 5 a representation of a method for the use of the touch-sensitive screen.

FIGS. 1*a-c* show an input unit 1 which is designed as a mobile telephone, in three different views. FIG. 1*a* shows an oblique view, FIG. 1*b* a front view and FIG. 1*c* a rear view. The input unit comprises a housing 1.3. The front side 1.4 with touch-sensitive screen 1.1 and with a button 1.2 is to be seen in the oblique view, FIG. 1*a*, and in the front view, FIG. 1*b*. Inputs can be made by the user via the touch-sensitive screen 1.1 and the button 1.2, and furthermore a visual output can be effected via the touch-sensitive screen. Furthermore, it is also possible for the input unit to be designed with further systems for outputting signals, for example with loudspeakers for an acoustic output or a vibration system. The input unit further has a memory, in which data is stored, and one or more acceleration sensors for gathering second sensor data. Accelerations of the input unit can be detected by way of the acceleration sensors, which means for example that an alignment of the input unit with regard to the earth's gravitational field as well as a tilting or rotation about different axes and a translatory movement or displacement can be detected. Such actions can therefore be derived from the second sensor data. In particular, by way of this one can determine whether the input unit was put down, on which side it was placed and whether it was placed onto a horizontal surface. A putting-down and a picking-up of the input unit by way of a user entails a characteristic acceleration. A sequence of individual putting-down processes or picking-up processes can thus be reconstructed from a temporal sequence of the second sensor data. The second sensor data is at least partly and at least temporarily stored in a memory of the input unit 1 and is provided with a time stamp. Apart from the acceleration sensors, the input unit also comprises a camera which can be used as a colour sensor. The input unit can also comprise a distance sensor, for instance an infrared distance sensor. Furthermore, the input unit 1 comprises a Bluetooth unit for sending and receiving data via Bluetooth, as well as a WLAN unit for sending and receiving data via WLAN. Such sensors and sending and receiving units are typically installed into mobile telephones.

FIG. 1c shows a rear side 1.5 of the input unit 1, into which a cut-out a is incorporated for illustration purposes, through which cut-out an inside of the input unit 1 is exposed. An electrically conductive structure 1.6 is to be recognised in the inside, said structure comprising e.g. parts of a battery, metallic housing parts and electrical conductors and further metallic components on circuit boards of the input unit. The conductive structure 1.6 forms an arrangement of conductive components which are conductively connected to one another at least partly. This structure 1.6 is detectable by way of touch-sensitive capacitive sensors of a touch screen, as is explained yet further in the context of FIGS. 2 to 4.

FIG. 2 shows a system which comprises a touch-sensitive screen 2 which is designed as a table, a control and processing unit 3 and the input unit 1 of FIG. 1. The touch-sensitive screen has a communication connection A with the control and processing unit 3 via a cable, in this case via USB 3.0, and the input unit 1 has a wireless communication connection B with the control and processing unit 2 via Bluetooth. The input unit 2, as is indicated by an arrow, is put down or placed onto the touch-sensitive screen 2.

The placing of the input unit 1 onto the touch-sensitive screen 2 is detected by capacitive sensors of the touch-sensitive screen 2 due to the conductive structure 1.6 of the input unit. Corresponding first sensor data which is generated by way of capacitive sensors of the touch-sensitive screen are forwarded as an analog signal to a touch controller which with regard to construction can be integrated into a circuit board of the touch-sensitive screen, said screen being designed as table, and there the data is digitalised and interpolated in a temporal interval of 0.1 ms and then together with a time stamp is transferred via USB 3-0 to the control and processing unit 3 where the first sensor data is received, stored and further processed. Herein, the touch controller can also be part of the control and processing unit 3 and the control and processing unit 3 or parts thereof can likewise be integrated into the plate of the touch-sensitive screen 2 or into a housing of the touch-sensitive screen.

The placing-on or putting-down of the input unit 1 along the drawn-in arrow, apart from by the capacitive sensors of the touch-sensitive screen is also detected by the acceleration sensors of the input unit 1. Corresponding second sensor data is gathered with the help of the acceleration sensors and together with a time stamp is transferred to the control and processing unit where it is received, stored and processed further. Alternatively or additionally, a putting-down can also be detected by the possible distance sensor or camera of the input unit 1.

The control and processing unit 3 examines a temporal sequence of the first and second sensor data on the basis of the time stamp and by way of this ascertains whether the placing-on which is detected by the capacitive sensors is effected simultaneously with the putting-down which is detected by the acceleration sensors.

By way of this time comparison, one can ascertain whether indeed the input unit has been put down on the screen. In the present case, the first and the second data are gathered in an interval of 10 ms. One can therefore rule out with an adequate sureness that it is not another object which has been placed onto the touch-sensitive screen whilst the input unit has been placed onto another location.

After the input unit 1 has been put down onto the touch-sensitive screen 2, the control and processing unit 3 creates a capacitance pattern for the conductive structure 1.6 of the input unit from the first sensor data and stores this pattern, wherein the capacitance pattern comprises a spatially resolved representation of at least two differently large capacitance changes or at least three capacitance values which are differently large in pairs or variables which are derived therefrom. These capacitance patterns are explained in more detail in the context of FIG. 4.

If the aforementioned simultaneity of the putting-down and placing-on has been verified by the control and processing unit 3 and it has therefore been ensured that the input unit 1 lies on the touch-sensitive screen 2, the control and processing unit creates a coupling mode for the input unit by way of sending data to and/or receiving data from the input unit.

On creating the coupling mode, one can also take into account whether the input unit has been placed onto the rear side, so that the touch-sensitive screen 1.1 of the input unit 1 is accessible and is visible and a coupling is otherwise not carried out. This is preferably determined from the second sensor data of the acceleration sensor, but in some cases can also be determined from the first sensor data, as explained later.

Data can be exchanged between the memory of the control and processing unit and the memory of the input unit in a wireless manner after the coupling mode is created In the coupling mode, the control and processing unit 3 herein also determines the position and orientation of the input unit 1 on the touch-sensitive screen 2 from the first sensor data.

FIG. 3 shows the system of FIG. 2, with regard to which apart from the input unit which is shown there, yet a second input unit 1' is placed onto the touch-sensitive screen. The second input unit 1' comprises similar or the same features as the first input unit 1. It likewise at least has a conductive structure, a touch-sensitive screen, a button, a memory, acceleration sensors and a Bluetooth communication unit.

The control and processing unit 3 interacts with the second input unit 1' essentially in the same manner as with the first input unit 1. It receives further second sensor data of an acceleration sensor of the second input unit 1', with which a putting-down can be derived, and again by way of a temporal sequence of the first sensor data of the touch-sensitive screen and of the additional second sensor data of the second input unit examines whether the second unit 1' has been placed upon the touch-sensitive screen 2.

In the case of a positive testing, the creation and storage of a capacitance pattern for the conductive structure of the second input unit and the creation of a coupling mode for the second input unit by way of sending data to and/or receiving data from the second input unit 1' are then effected. The capacitance pattern again comprises a spatially resolved representation of at least two differently large capacitance changes or at least three capacitance values which are differently large in pairs or variables which are derived therefrom.

Further interactions of the system are described hereinafter. Herein, it is to be noted that these interactions can be effected analogously given one placed-on input device as well as given more than two placed-on input devices.

The control and processing unit 3 is configured to activate the touch-sensitive screen 2 on the basis of the first and/or second sensor data. This means that if for example the input unit 1 is moved along the arrow which is shown in the figure, this is registered by the control and processing unit and actions can hereupon be carried out. In particular, a display of the touch-sensitive screen 2 can be changed depending on this sensor data if the coupling mode exists. The control and processing unit 3 can for example colour-mark a region of the touch-sensitive screen 2 which represents an environment of the placed-on input unit 1, or blend in lettering there.

Other actions, for example a data exchange can also be initiated on the basis of the first and second sensor data. For example, a data exchange can be initiated between the memory of the control and processing unit and the memory of an input unit 1, 1' which is placed onto or pushed into a certain, typically marked region of the touch-sensitive screen.

Furthermore, the control and processing unit can receive input signals of the touch-sensitive screen as well as input signals of the touch-sensitive screen of the input unit which it can likewise activate.

Concluding, one can say that for example inputs on the touch-sensitive screen itself, for example by the finger, as well as inputs into the input unit or into the input units, by way of their touch-sensitive screen or button, and additional inputs by way of movements of the input unit or of the input units, are possible as input possibilities for the control and processing unit. On the other hand are the possible actions which the control and processing unit 3 can carry out. These include for example: modifying the display of the touch-sensitive screen 2, modifying the display of the input unit 1, 1' or input units, data exchange between the input unit 1, 1' and the control and processing unit 3. Given several placed-on input units, actions concerning which data is exchanged between two or more input units 1, 1' which are each coupled to the control and processing unit 3 are also possible. Herein, each of the actions can be carried out on the basis of each of the inputs.

Such inputs and actions are typically possible if the input unit has been put down on the screen or if the coupling mode has been created by placing-on and has not been ended by an envisaged action.

The aspect of the placing onto a screen can herein serve as a security function.

FIGS. 4*a* and 4*b* show black-and-white pictures, in which first sensor signals of the capacitive sensors of a touch-sensitive screen are represented in a spatially resolved manner. A capacitive grid of the touch-sensitive screen, of electrical detection strip conductors which are arranged orthogonally to one another, is indicated by white lines on a black background. The horizontal detection strip conductors are herein located in a first plane and the vertical detection strip conductors in a second plane which is distanced thereto, so that a capacitance can be measured at the crossing points between the horizontal and the vertical lines (which represent a projection of the detection strip conductors upon one another). If a finger or a conductive structure of a placed-on input unit is brought into the proximity of the grid, then the capacitance changes at the crossing points which lie in the region, in which the contacting or approach takes place. The crossing points therefore represent the pixels, at which spatially resolved capacitance changes can be detected. A detail of the screen, in which an input unit has been put down, is shown in the figures. A capacitance change is registered at a few crossing points where the input unit has been put down, said capacitance change having been rendered recognisable in the pictures by way of white colouring-in of a square region around the respective crossing point if it exceeds a certain threshold value. A location, at which the input unit has been placed upon the screen can therefore be detected. In particular, the location can be derived from FIG. 4*a* as well as FIG. 4*b*.

It is to be noted that the type of detection typically presupposes a coupling of the conductive structure to earth. The coupling can hereby be effected via the body of a user. However, a detection can also be effected with passive input units, thus if the input unit is not touched. Since, with the exception of a horizontal and a vertical detection strip conductor of the mentioned grid, e.g. adjacent detection strip conductors lie at earth, a down-conduction is also possible if a region of the conductive structure is located on a detection strip conductor which lies at earth. Since the conductive structures 1.6 extend over a large region of the input unit in the case of typical input units 1, it is no longer necessary for the input element to be touched by the user for a reliable detection by the touch-sensitive screen.

It is of relevance to the present invention that apart from a location of such a capacitance change, its magnitude is also detectable, in order to be able to create a capacitance pattern for the conductive structure 1.6 of the input unit 1, said pattern containing a spatially resolved representation of at least two differently large capacitance changes or at least three capacitance values which are differently large in pairs or variables which are derived therefrom.

This for example is effected by way of using different threshold values for the detection of the capacitance changes, so that a signal is triggered for example at 10%, 20%, 30%, . . . 100% of a maximal value. At least two such threshold values are used in the context of this application.

FIG. 4*a* shows a picture which was take at a threshold value of 1 pF and FIG. 4*b* a picture which was taken at a threshold value of 2.5 pF. This corresponds to 10% and 25% respectively of a capacitance change of 10 pF which is caused by a finger and is used here as a maximal value.

This means that only a very small capacitance change is necessary for a first signal (FIG. 4*a*) which is already triggered at 10% of the maximal value. This is induced at almost all locations, at which the input unit 1 contacts the screen, since even weakly conductive parts of the conductive structure 1.6 or those which lie far from the lower side 1.5 of the input unit which contacts the screen still interact with the capacitive grid in an adequately strong manner. Accordingly, the picture of FIG. 4*a* reproduces the outline of the complete input unit. It can therefore be used for determining the position, but provides no information on the inner structure. For example, it is not evident where above and below is and whether the input unit lies on the front side or on the rear side. Furthermore, one cannot ascertain the type of input unit, e.g. which mobile telephone model it is.

In contrast, the second signal (FIG. 4b) is only triggered when capacitance changes of at least 2.5 pF are present. This means that the capacitance change is caused e.g. only by well conductive materials which are located in layers close to the rear side of the input unit. A more differentiated picture arises by way of this. The conductive structure 1.6 at this threshold value triggers a signal in two regions which are separate from one another. A first, smaller region, in which capacitance changes with at least one of the specified magnitudes are present lies spatially separated below a second, larger region, in which such capacitance changes are triggered. A symmetry is broken due to this and the orientation of the input unit can also be analysed additionally to the position. For example, by way of comparing data from the memory of the control and processing unit 3 one can ascertain that an upper side of the input unit 1 is located at the top or one can at least register that above and below are different with the present input unit, and the same picture does not result after a rotation about 180°. This information is also helpful if the acceleration sensors of the input unit 1 are additionally used for detecting movements, since a redundancy which is useful for various applications can be achieved by way of this.

As mentioned, the control and processing unit can compare the capacitance pattern with already known capacitance patterns, in order for example to identify an input unit 1 or its construction type. The recognition can be self-learnt for example with methods of machine learning. Herein, it is to be noted that an identification can typically not only be based on absolute values of the capacitance changes, since the absolute value depends on whether the input unit is touched, where it lies on the screen and how it is orientated.

If the capacitance pattern is detected, then the control and processing unit can track its movements, thus for example rotations and/or translations on the screen, on the basis of the first sensor data. In particular, this can be effected in the coupling mode and typically comprises an evaluation and comparison of the first and second sensor data.

FIGS. 4a and 4b taken together therefore form a possible capacitance pattern in the context of this application. Instead of being represented in two separate black-and-white pictures, as is represented in FIG. 4a and FIG. 4b, the same information content can also be represented e.g. in a single greyscale picture.

FIG. 5 schematically shows steps S1 to S15 of a method for using a touch-sensitive screen or a system described above. The sequence which is described there represents an exemplary sequence, in which possible interactions are represented, said interactions comprising inputs and executed actions. Numerous further possibilities can be derived therefrom. The possible actions which are described there in particular can be activated from every other one of the possible inputs which are shown there.

A temporal sequence of steps is indicated by an arrow with the lettering t, and the steps which are at the top are accordingly carried out first of all.

The interactions such as an activation or data exchange between the touch-sensitive screen, the control and processing unit 3 and the input unit 1 is represented by arrows which connect the lines which are marked at 1, 2, and 3.

In a first step S1, capacitance changes are detected in a time-resolved and locally-resolved manner by way of capacitive sensors of the touch-sensitive screen 2 and corresponding first sensor data is transferred to the control and processing unit 3, received there and stored.

In a step S2, a putting-down of the input unit 1 is detected in a time-resolved manner by way of acceleration sensors of the input unit 1 and corresponding second sensor data is transferred to the control and processing unit 3, received there and stored.

The control and processing unit then in step S3 examines a temporal sequence of the first and the second sensor data as to whether the input unit was indeed placed upon the touch-sensitive screen, thus whether the putting-down and the placing-on are effected simultaneously. If this is the case, as is indicated here by the position of the arrows S1 and S2, the control and processing unit creates a capacitance pattern for the conductive structure of the input unit from the first sensor data which is transferred in S1 and stores it, wherein the capacitance pattern comprises a spatially resolved representation of at least two differently large capacitance changes or at least three capacitance values which are differently large in pairs or variables which are derived therefrom. In the step, the capacitance pattern can also be compared to already known capacitance patterns. Furthermore, a position and an orientation of the input unit are usually determined from the first sensor data which are transferred in step S1.

In step S4, the control and processing unit then creates a coupling mode with the input unit by way of it sending data to this.

In step S5, the control and processing unit 3 receives data from the input unit 1. This data can also concern the creation of the coupling mode or it can be based on the input of the touch-sensitive screen of the input unit, or memory data can be transferred.

In step 6, the control and processing unit 3 interacts with the touch-sensitive screen 2 by way of it activating this and for example it being displayed there that the coupling mode has been created.

In step S7, the control and processing unit 3 receives first sensor data which belong to a movement of the input unit 1 on the touch-sensitive screen.

In step S8, the control and processing unit 3 receives second sensor data from the input unit 1 simultaneously with step S7, said second sensor data belonging to the same movement.

It is to be noted that it is also possible for a movement which is detected as in S7 and S8 to only be detected by one of the sensors, therefore for S7 but not S8 or S8 but not S7 to be carried out. The described double detection possibility can then serve as a security function that the movement is registered despite this.

The movement from the steps S7 and S8 is tracked by the control and processing unit and can be interpreted in the present example as a command, on account of which in step 9 the control and processing unit activates the touch-sensitive screen 2 and in step S10 activates the optional touch-sensitive screen 1.1 of the input unit. Herein, the steps S9 and S10 can be effected simultaneously or in an arbitrary sequence one after the other.

An input into the touch-sensitive screen by a finger is effected in step S11. This is registered by the control and processing unit and is interpreted as a command to activate step S12. In S12, pre-stored data is copied from the memory of the control and processing unit 3 into the memory of the input unit 1.

In S13, first sensor data is transferred to the control and processing unit, said first data being able to be associated with a picking-up. At the same time, in S14 the respective second sensor data is transferred from the input unit. Here too, analogously to above (S7, S8), again only S13 or only S14 can be carried out, in order to detect a picking-up. In step S15 the control and processing unit after the interpretation of this data ends or changes the coupling mode on account of the effected picking-up.

LIST OF REFERENCE NUMERALS 1, 1' input unit
1.1 touch-sensitive screen with the input unit
1.2 button of the input unit
1.3 housing of the input unit
1.4 front side of the input unit
1.5 rear side of the input unit
1.6 conductive structure of the input unit
2 touch-sensitive screen
3 control and processing unit
a detail from the rear side of the input unit
A communication connection between the touch-sensitive screen and the control and processing unit
B, B' wireless communication connection between the input unit and the control and processing unit

The invention claimed is:

1. A control and processing unit for a touch-sensitive screen, comprising:
a communication unit; and
a memory including instructions stored thereon which, when performed by a processor included on or connected to the control and processing unit, cause the control and processing unit to:
receive a first sensor data which is generated by way of a capacitive sensor of the touch-sensitive screen,
receive a second sensor data which is transferred from an input unit to the control and processing unit, wherein the second sensor data comprises data of a sensor of the input unit, said sensor being designed to detect a putting-down of the input unit,
examine, on the basis of a temporal sequence of the first sensor data and the second sensor data, whether a putting-down of the input unit has been detected simultaneously with a placing on of an object with a conductive structure onto the touch-sensitive screen, in order to ascertain whether the input unit has been put down on the touch-sensitive screen,
create and store a capacitance pattern for the conductive structure of the input unit, wherein the capacitance pattern is based on a spatially resolved representation of: at least two differently valued capacitance changes or at least three capacitance values which are differently valued in pairs,
create a coupling mode for the input unit by way of sending data to the input unit and/or receiving data from the input unit, when the placing-on and the putting-down have been detected simultaneously.

2. The control and processing unit according to claim 1, wherein the control and processing unit is further to:
determine a position of the input unit on the touch-sensitive screen if the input unit has been put down on the touch-sensitive screen.

3. The control and processing unit according to claim 1, wherein the control and processing unit is further to:
compare the capacitance pattern of the input unit with an already known capacitance pattern.

4. The control and processing unit according to claim 1, wherein the control and processing unit is further to:
determine an orientation of the input unit from the capacitance pattern of the input unit.

5. The control and processing unit according to claim 1, wherein the control and processing unit is further to:
track at least one of a rotation or a translation of the input unit on the touch-sensitive screen if the input unit has been put down on the touch-sensitive screen, by way of evaluating at least one of the first sensor data or the second sensor data by comparing the first sensor data with the second sensor data.

6. The control and processing unit according to claim 1, wherein the control and processing unit is further to:
wirelessly exchange data (B, B') between the memory of the control and processing unit (3') and a memory of the input unit when the input unit has been put down on the touch-sensitive screen.

7. The control and processing unit according to claim 1, wherein the second sensor data comprises data from at least one of: an acceleration sensor, a gyroscope, a distance sensor, a colour-sensor, or GPS system of the input unit.

8. The control and processing unit according to claim 1, wherein the control and processing unit is further to at least one of:
activate the touch-sensitive screen on the basis of at least one of the first sensor data or the second sensor data, or
receive an input signal of the touch-sensitive screen.

9. The control and processing unit according to claim 1, wherein the control and processing unit is further to at least one of:
activate a touch-sensitive screen of the input unit or
receive an input signal of the touch-sensitive screen of the input unit.

10. The control and processing unit according to claim 9, wherein the touch-sensitive screen is activated on the basis of the input signal of the touch-sensitive screen of the input unit.

11. The control and processing unit according to claim 1, wherein the control and processing unit is further to:
determine a temporal sequence of the first sensor and the second sensor data, each with an accuracy of within 100 ms.

12. The control and processing unit according to claim 1, wherein the control and processing unit is further to:
end the coupling mode if the first sensor data and/or the second sensor data can be attributed to a picking-up of the input unit.

13. The control and processing unit according to claim 1, wherein the control and processing unit is further to:
receive further second sensor data of at least one further input unit which is transferred from the at least one further input unit to the control and processing unit, wherein the further second sensor data comprises data of a sensor of the at least one further input unit, wherein the sensor of the at least one further input unit configured to detect a putting-down of the at least one further input unit,
determine on the basis of the temporal sequence of the first sensor data and of a temporal sequence of the further second data as to whether a putting-down of the at least one further input unit has been detected simultaneously with a placing of a further object with a conductive structure onto the screen, in order to determine whether the at least one further input has been put down on touch-sensitive screen,
create and store a capacitance pattern for the conductive structure of the further input unit,
when the placing-on and the putting-down have been detected simultaneously, create a coupling mode for the at least one further input unit by at least one of sending data to or receiving data from the at least one further input unit.

14. A system with a touch-sensitive screen, a control and processing unit and an input unit, wherein:
   the touch-sensitive screen comprises a capacitive sensor for gathering first sensor data;
   the input unit comprises a conductive structure which on placing the input unit onto a touch-sensitive screen induces a capacitance change which is detectable by the capacitive sensor of the touch-sensitive screen;
   the input unit comprises a sensor for gathering second sensor data, wherein the sensor is designed to detect a putting-down of the input unit;
   the input unit is configured to transfer the second sensor data to the control and processing unit;
   the control and processing unit is configured to examine, on the basis of a temporal sequence of the first and second sensor data, whether a putting-down of the input unit has been detected simultaneously with the placing on of an object with a conductive structure onto the touch-sensitive screen, in order to ascertain whether the input unit has been put down on the touch-sensitive screen, and is configured to create and store a capacitance pattern for the conductive structure of the input unit, wherein the capacitance pattern is based on a spatially resolved representation of at least one of: at least two differently valued capacitance changes or at least three capacitance values which are differently valued in pairs; and
and processing unit and the input unit when the placing-on and the putting-down have been simultaneously detected.

15. A method for the use of a touch-sensitive screen, comprising at least the following steps:
   detecting a capacitance change by way of a capacitive sensor of a touch-sensitive screen, wherein the capacitance changes are caused by a conductive structure of an object which is placed onto the touch-sensitive screen;
   detecting a putting-down of an input unit by way of a sensor of the input unit,
   examining whether a putting-down of the input unit has been detected simultaneously with a placing on of the object with the conductive structure onto the touch-sensitive screen, in order to ascertain whether the detected conductive structure is a conductive structure of the input unit and whether the input unit has been put down on the screen;
   creating and storing a capacitance pattern for the conductive structure of the input unit, wherein the capacitance pattern is based on a locally resolved representation of at least one of: at least two differently valued capacitance changes or at least three capacitance values which are differently valued in pairs; and
   creating a coupling mode between a control and processing unit of the touch-sensitive screen and the input unit by way of an exchange of data between the control and processing unit and the input unit when the placing-on and the putting-down have been simultaneously detected.

16. The control and processing unit according to claim 1, wherein the control and processing unit is further to:
   determine a temporal sequence of the first sensor data and the second sensor data, each with an accuracy of within 50 ms.

17. The control and processing unit according to claim 1, wherein the control and processing unit is further to:
   determine a temporal sequence of the first sensor data and the second sensor data, each with an accuracy of within 20 ms.

18. The control and processing unit according to claim 1, wherein the control and processing unit is further to:
   determine a temporal sequence of the first sensor data and the second sensor data, each with an accuracy of within 10 ms.

* * * * *